No. 772,838. PATENTED OCT. 18, 1904.
W. SIMM.
LIFE GUARD FOR TRAM CARS OR OTHER ELECTRICALLY PROPELLED VEHICLES.
APPLICATION FILED JAN. 12, 1903.
NO MODEL. 2 SHEETS—SHEET 1.

Inventor
William Simm

By his attorney
Edward P. Thompson

No. 772,838. PATENTED OCT. 18, 1904.
W. SIMM.
LIFE GUARD FOR TRAM CARS OR OTHER ELECTRICALLY PROPELLED VEHICLES.
APPLICATION FILED JAN. 12, 1903.
NO MODEL. 2 SHEETS—SHEET 2.
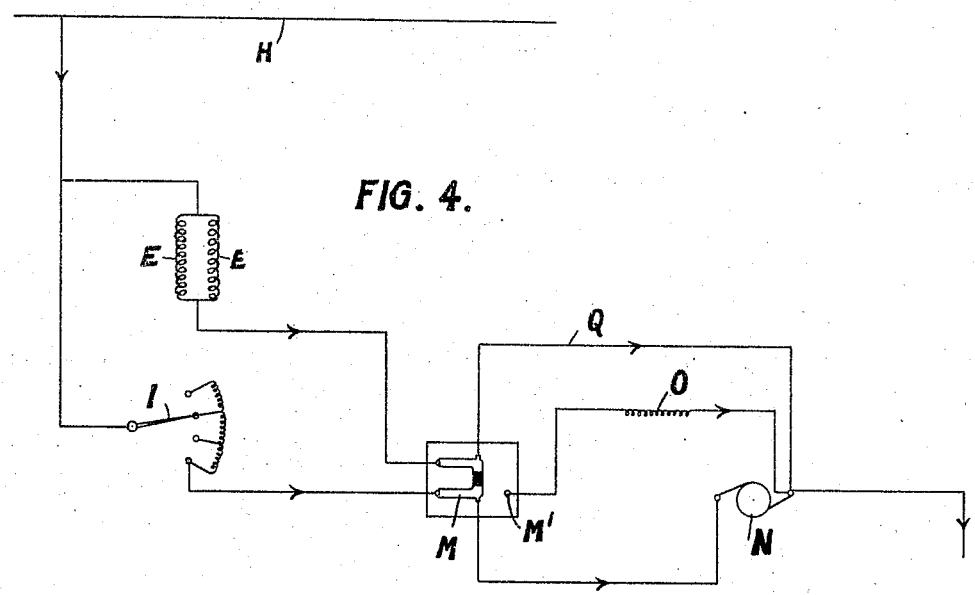
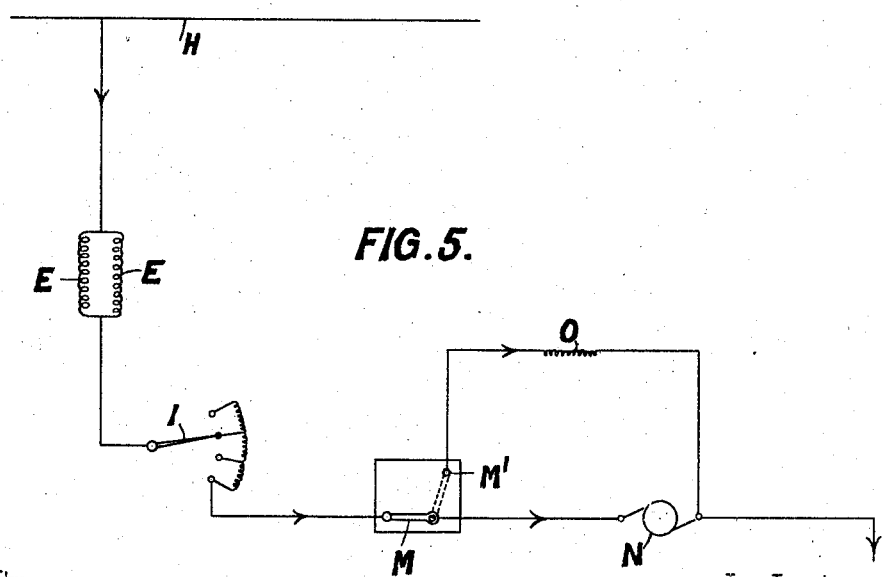
Witnesses
Anna R. McCole
M. Kelley
Inventor
William Simm
By his attorney
Edward P. Thompson No. 772,838. Patented October 18, 1904.

UNITED STATES PATENT OFFICE.

WILLIAM SIMM, OF PORTICO, NEAR PRESCOT, ENGLAND.

LIFE-GUARD FOR TRAM-CARS OR OTHER ELECTRICALLY-PROPELLED VEHICLES.

SPECIFICATION forming part of Letters Patent No. 772,838, dated October 18, 1904.

Application filed January 12, 1903. Serial No. 138,678. (No model.)

*To all whom it may concern:*

Be it known that I, WILLIAM SIMM, electrical engineer, a subject of the King of Great Britain, residing in Portico, near Prescot, in the county of Lancaster, England, (whose full postal address is "The Ash," Portico, aforesaid,) have invented certain new and useful Improvements in Life-Guards for Tram-Cars or other Electrically-Propelled Vehicles, (for which application has been made in Great Britain, No. 15,029, dated July 5, 1902,) of which the following is a specification.

This invention relates to life-saving devices for use upon electrically-propelled vehicles and to means operated in connection with said devices for checking or stopping the vehicles.

Figure 1:
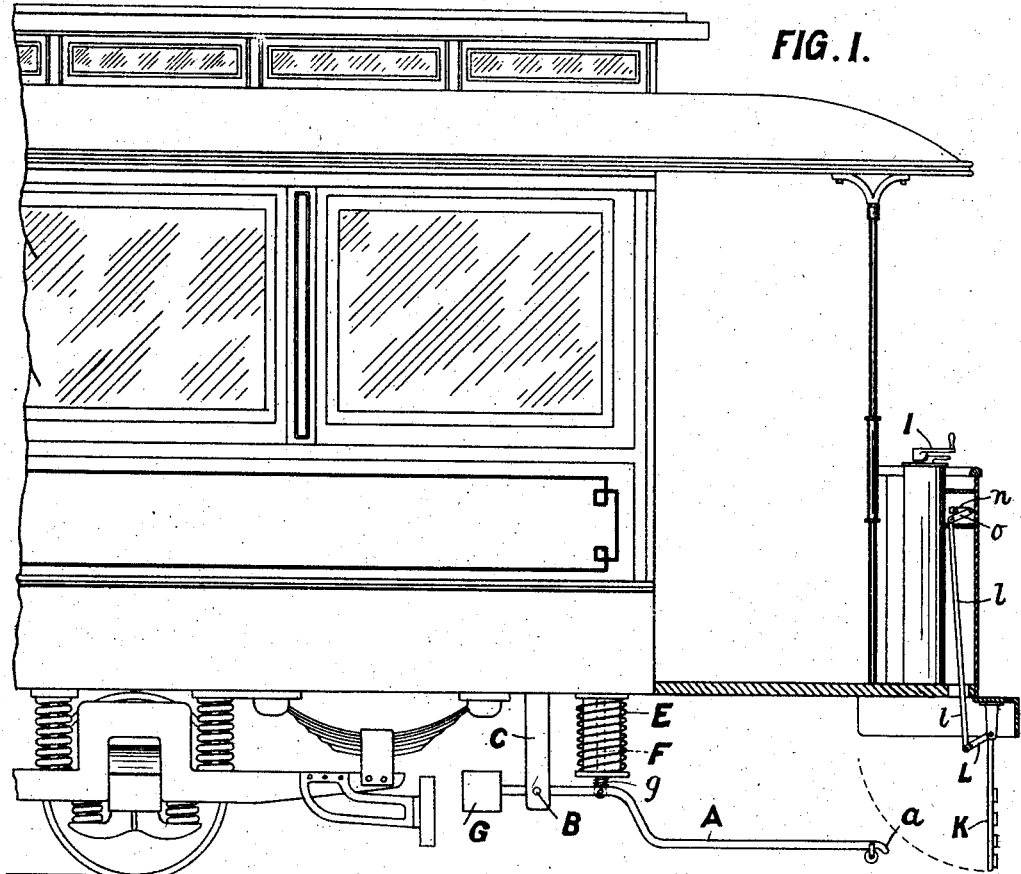
Figure 3:
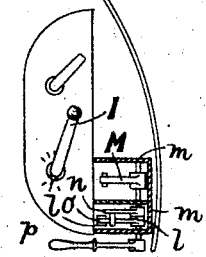
Figure 2:
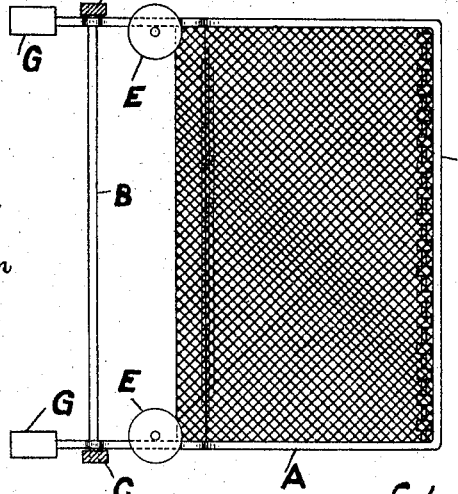

The invention will be described with reference to the accompanying drawings, in which—
Figure 1 is a sectional side elevation of the front portion of an electric car provided with the improvements of the present invention. Fig. 2 is a partial plan showing the fender and solenoids. Fig. 3 is a sectional plan of a switch mechanism, drawn to a larger scale. Figs. 4 and 5 are diagrams of the circuits as arranged with the solenoids in parallel and shunt, respectively, with the controller.

In carrying the invention into effect a fender or guard A, Figs. 1 and 2, is hung on rigid bars B C D under the car-frame in front of the wheels and is arranged so as to normally lie with its front edge *a* close to the ground—say about an inch above it.
Beneath the car-body, above the fender A, are one, two, or more solenoids E, which are adapted to lift and hold up the fender A when current is passing through them. For this purpose movable cores F of the solenoids are pivotally connected to the fender A, and the latter is furnished with counterweights G to reduce the downward tendency of its front portion to an amount which will just enable it to fall in the required manner when no current flows through the solenoids E. The action of falling may also be started or assisted, if desired, by springs *g*. The solenoids E, as shown by the diagram in Fig. 5, are in parallel series between the line-wire H and the controller I and are always in action, keeping the fender raised, as long as any current is passing through the controller, and consequently through the solenoids; but when the current is shut off and the car is stopped the solenoids E are always demagnetized or deenergized and the fender is allowed to drop.

A feeler K, Fig. 1, is hung close to the front of the car and is connected by an arm L and link *l* to a double contact-switch M, arranged in series between the controller I and the motor. This switch M, which may be located at any convenient position, is preferably of the spring-tumbler type, having a quick make and break and is inclosed in a box *m*, Fig. 3. Its axis of oscillation is prolonged through the box *m* and carries a fast arm *n* and a loose arm *o*. The arm *n* has a lateral pin with which it bears on the arm *o*, and the latter is pivotally connected to the link *l* from the feeler. When the arm *o* is lifted by the link *l*, due to a backward swing of the feeler, it lifts with it the arm *n* until the latter is thrown over by the tumbler-spring of the switch M. The switch now remains in this position with the line-circuit cut out until the driver operates an exterior hand-lever *p* to return all the parts to normal position. When the feeler K is hanging normally, the circuit between the controller I and motor N is closed, as shown in Fig. 5, and the fender is held up by the excited solenoids E. The second contact M' of the switch M is connected to a wire which has a resistance O or an electric brake in its circuit and is connected to the negative side of the motor N. This circuit is closed by the throwing over of the switch M when the feeler is pressed back by contact with a body or obstruction, and the line-circuit H is completely cut off, as before described, so that the solenoids E are demagnetized and allow the fender to fall, and, further, the closing of this shunt-circuit through the resistance O short-circuits the motor N, as shown by the dotted position of the switch, and as the car moves on until coming to rest the motor becomes a generator, the poles being reversed. The resistance O in this shunt-circuit prevents too great heating by the reversal of current, or, if an electric brake is used, the work done in applying the brake serves the same purpose. A suitable electric brake is one of the slipper type, which is made to engage with the rail by electromagnets in any ordinary or known manner. Without the use of the electric brake, however, the car will be rapidly brought to a standstill owing to the fact that its momentum is being used up in generating current in the motor N.

It will be seen that the whole of this apparatus is automatic, as the movement of the feeler and action of the switch simultaneously breaks the line-wire circuit, releases the solenoids and the fender, and short-circuits the motor, turning it into a generator for the moment, and the position of the controller at the time of action has no effect upon the operation of the device.

The solenoids may be arranged in any other suitable way so as to always be in circuit when current is passing, but to be cut out immediately the switch is operated. An example of this arrangement of the circuits is illustrated in Fig. 4 by a diagram which shows the solenoids E connected in parallel with the controller I, in which case the fender will not drop when the current is shut off from the motor N by the controller I to stop the car, as the current still flows through the solenoids. With this arrangement a switch is used having double arms, which move together, as shown, the two arms being insulated one from another, and the auxiliary arm has a subsidiary wire Q connecting it to the negative side of the motor N. The solenoids may equally well be arranged in series between the controller and the switch, but must never be placed between the switch and the motor, as a current passes through that part of the circuit when the motor is short-circuited. They are preferably arranged over the fender near the hinge end, as shown in Figs. 1 and 2, so that a short movement of the cores or equivalent magnetic device is sufficient to raise or lower the front edge of the fender.

This invention is not restricted to the specific switch mechanism described as an example.

I declare that what I claim is—

1. In a life-guard for tram-cars and other electrically-propelled vehicles, the combination with the motor and a guard or fender adapted to fall into operating position, of electromagnetic means for normally holding up the fender by magnetic pull, a feeler, and a switch device in circuit with the motor, said switch device being adapted to be actuated by backward movement of the feeler to cut out and deënergize the electromagnetic means thereby allowing the fender to drop, and to simultaneously cut out the motor, substantially as described.

2. In a life-guard for tram-cars and other electrically-propelled vehicles, the combination with the motor and a guard or fender adapted to fall into operating position, of solenoids having movable cores connected to the fender, an electric circuit through said solenoids to energize same and normally hold up the fender, a feeler, and a switch device in circuit with the motor, said switch device being adapted to be actuated by backward movement of the feeler to cut out and deënergize the solenoids and allow the fender to drop, and to simultaneously cut out the motor, substantially as described.

3. In a life-guard for tram-cars and other electrically-propelled vehicles, the combination with the motor and a guard or fender adapted to fall into operating position, of electromagnetic means for normally holding up the fender by magnetic pull, means adapted to electrically apply a braking force to the vehicle, a feeler, and a switch device adapted to be actuated by backward movement of the feeler to cut out and deënergize the electromagnetic means thereby allowing the fender to drop, and to simultaneously cut out the motor and apply the braking force, substantially as described.

4. In a life-guard for tram-cars and other electrically-propelled vehicles, the combination with the motor and a guard or fender adapted to fall into operating position, of electromagnetic means for normally holding up the fender by magnetic pull, a normally open subsidiary circuit with interposed resistance to the negative side of the motor, a feeler and a switch device adapted to be actuated by backward movement of the feeler to cut out and deënergize the electromagnetic means thereby allowing the fender to drop, and to simultaneously close the resistant subsidiary circuit to cut out and short-circuit the motor on itself thereby applying a braking force to the vehicle, substantially as described.

5. In a life-guard for tram-cars and other electrically-propelled vehicles, the combination with the motor and a guard or fender adapted to fall into operating position, of electromagnetic means for normally holding up the fender by magnetic pull, a normally open subsidiary circuit with interposed resistance to the negative side of the motor, a feeler, and a double contact-switch device normally in circuit with the said electromagnetic means and with the motor and having the back contact connected as a terminal of the resistant subsidiary circuit, said switch device being adapted to be thrown over to the back contact by backward movement of the feeler, thereby cutting out and deënergizing the electromagnetic means to allow the fender to drop, and simultaneously closing the resistant subsidiary circuit to cut out and short-circuit the motor on itself thereby applying a braking force to the vehicle, substantially as described.

6. In a life-guard for tram-cars and other electrically-propelled vehicles, the combination with the motor and a guard or fender adapted to fall into operating position, of electromagnetic means for normally holding up the fender by magnetic pull, a normally closed electric circuit through said electromagnetic means in parallel with the controller to the negative side of the motor, a normally open subsidiary circuit with interposed resistance to the negative side of the motor for short-circuiting the latter, a feeler and a double contact-switch device interposed in said parallel circuit and in the motor-circuit adapted to be normally closed in these circuits, and having the back contact connected as a terminal of the resistant subsidiary circuit, said switch being adapted to be thrown over to the back contact by backward movement of the feeler to open the parallel and motor circuits and close the subsidiary circuit substantially as and for the purposes set forth.

7. In a life-guard for tram-cars and other electrically-propelled vehicles, the combination with a guard or fender adapted to fall into operating position, of electromagnetic means for normally holding it up by magnetic pull, a feeler, a switch device normally in circuit with said electromagnetic means, fast and loose arms on the axis of oscillation of the switch, link-gear from the feeler to the switch loose arm, a pin on the switch fast arm to bear normally on the loose arm, and an exterior hand-lever on the switch, substantially as and for the purpose set forth.

In witness whereof I have hereunto signed my name, this 29th day of December, 1902, in the presence of two subscribing witnesses.

WILLIAM SIMM.

Witnesses:
JOSEPH ROYDER,
HUBERT PUMPHREY.